March 12, 1957
R. MOREL
2,785,320
CONSTRUCTION OF AN ELECTROSTATIC MACHINE
HAVING AN INSULATING CONVEYOR
Filed March 7, 1955
2 Sheets-Sheet 2
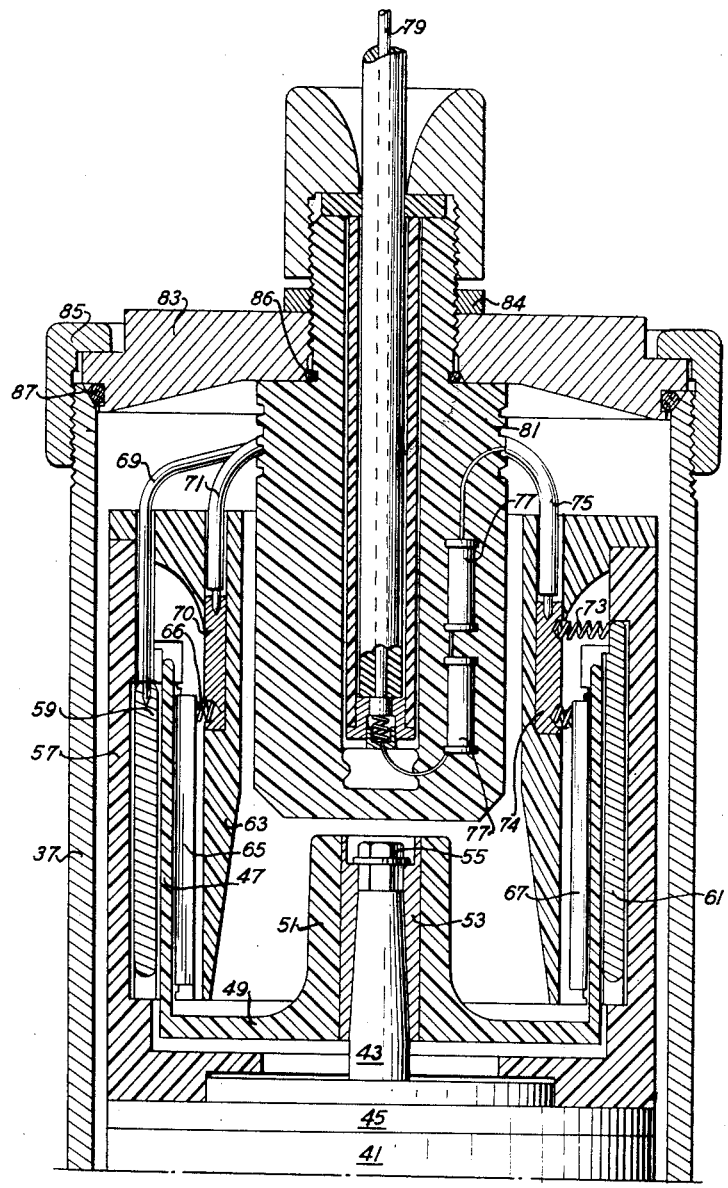
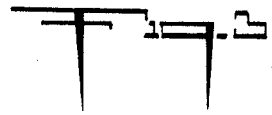
INVENTOR
ROGER MOREL
BY *George H. Corey*
ATTORNEY

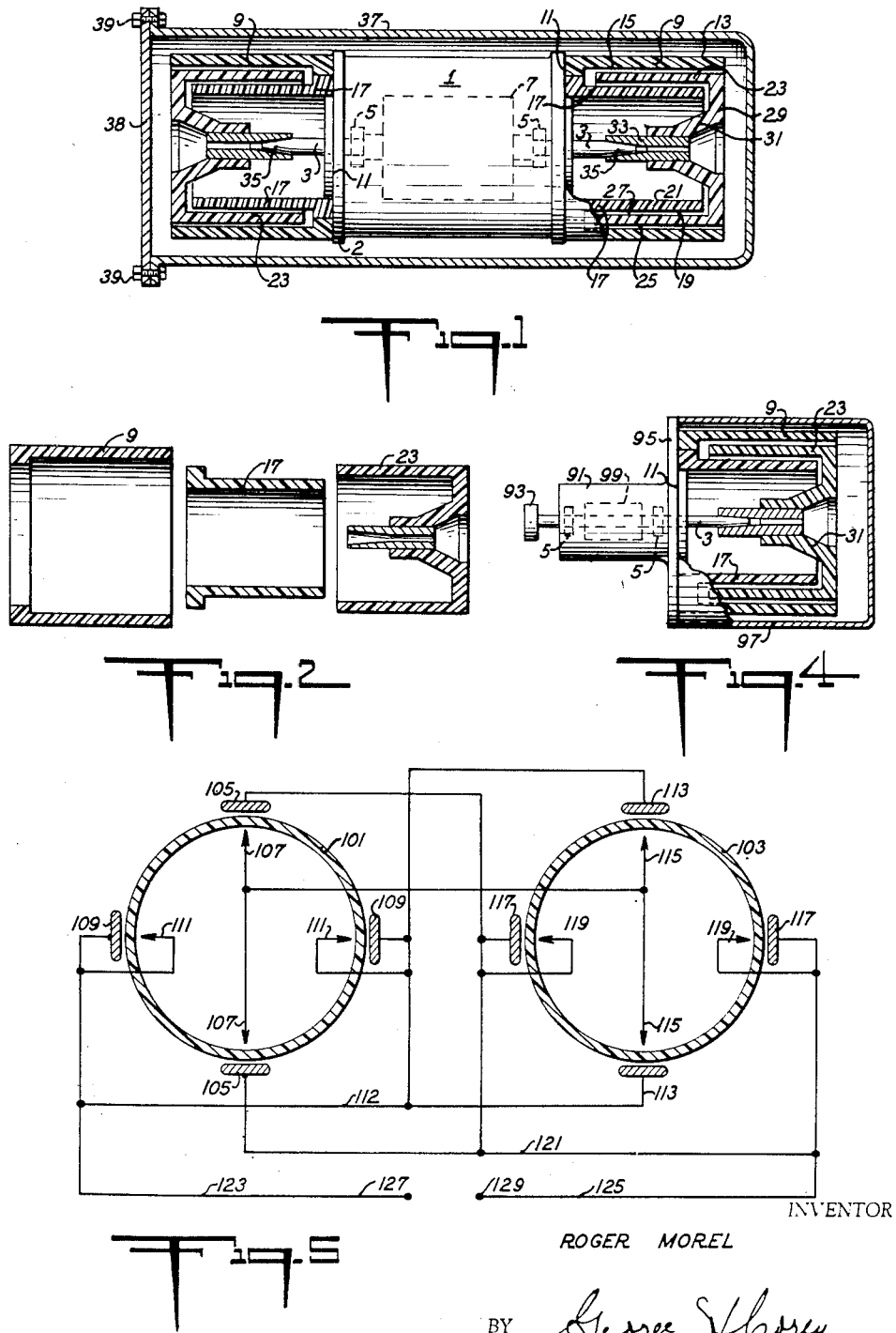

United States Patent Office 2,785,320
Patented Mar. 12, 1957

2,785,320

CONSTRUCTION OF AN ELECTROSTATIC MACHINE HAVING AN INSULATING CONVEYOR

Roger Morel, Grenoble, France, assignor to Societe Anonyme de Machines Electrostatiques, Grenoble, France, a corporation of France Application March 7, 1955, Serial No. 492,494

Claims priority, application France March 8, 1954

11 Claims. (Cl. 310—6)

This invention relates to electrostatic machines of the type which utilize a conveyor of insulating material and in which an electric field is developed between electrodes at opposite sides of the conveyor wall for producing a flow of ions through an ionizable medium, preferably a gas under pressure, to a surface of the conveyor to be conveyed thereon and collected therefrom by suitable collecting means. The invention particularly relates to an electrostatic machine of this type in which the conveyor is in the form of a wall of insulating material extending about an axis of rotation of the conveyor and providing surfaces of revolution that are concentric with this axis. An electrostatic machine of this general type is disclosed in the French Patent No. 1,051,430, published January 15, 1954, and in the corresponding U. S. application Serial No. 321,351, filed November 19, 1952.

It is an object of the present invention to provide in a machine of the type disclosed in the patent and application a simplified construction which will be of low manufacturing cost and will provide a compact and rugged structure.

It is another object of the invention to provide in an electrostatic machine of this type members which are of such form that they readily may be machined and easily may be assembled together to provide the requisite disposition of the members for proper electrostatic operation and which may be easily disassembled.

It is a further object of the invention to provide a construction of such an electrostatic machine in which the stationary members are securely and rigidly supported and provide even regular surfaces adjacent and in close relation to a rotary conveyor wall which is supported for rotation on its axis, a simple operative connection to a driving element or a power means being provided for effecting rotation of the conveyor, the space between stationary member and the conveyor being as small and as constant as possible.

It is a still further object of the invention to provide such a construction that a plurality of such machines may be assembled easily on a common supporting structure for rotation of the conveyors on a common axis and driven from a common power means.

It is a feature of the invention that a conveyor in the form of a wall of insulating material extending about an axis of rotation and providing outer and inner surfaces of revolution concentric with this axis is supported adjacent an end of the conveyor in cantilever relation to a conveyor supporting means. In a particular form this feature is embodied in the machine of the invention by mounting the conveyor on the projecting portion of a rotatable driving element or shaft which itself is supported by a supporting means for rotation thereof on the axis of rotation and projects in cantilever relation to this shaft supporting means. The conveyor may project from its supported end either in the same direction as the projection of the driving element from its support or in the opposite direction along the axis of rotation of the conveyor.

In order to provide support for the electrodes which function in the manner disclosed in the French Patent 1,051,043, an outer stator having a wall of insulating material extending about the axis of rotation and providing an inner surface of revolution about this axis is disposed outwardly with respect to and adjacent the outer surface of revolution of the conveyor wall. Similarly, an inner stator having a wall of insulating material extending about the axis of rotation and providing an outer surface of revolution about the axis is disposed inwardly with respect to and adjacent the inner surface of revolution of the conveyor wall. It is a significant feature of the invention that these two stator walls are supported by means disposed adjacent the driving element supporting means with the inner and outer surfaces of revolution of these walls disposed respectively in the described relation to outer and inner surfaces of revolution of the conveyor wall, these stator walls being supported in overhanging or cantilever relation to the stator wall supporting means and projecting along the axis of rotation from and in cantilever relation to their respective supported ends.

In one embodiment of the invention both stator walls are supported by the stator wall supporting means at the ends of these stator walls that are adjacent each other and adjacent the stator wall supporting means. In another embodiment the outer stator wall is supported at the end thereof adjacent the stator wall supporting means and the inner stator wall is supported by the opposite end of the outer stator wall. In either modification both stator walls may be of relatively light construction since they only are required to support their own weight and the weight of the field producing and the collector electrodes that ordinarily are in spaced relation about the axis of rotation and themselves are not of great weight. Because the conveyor is supported in cantilever relation to the conveyor supporting means and more particularly is supported upon the projecting portion of the rotatable driving element which projects from its supporting means in cantilever relation thereto, the stators are not required to support the rotatable element.

Moreover, because the conveyor, as well as the stators, are in the form of walls extending about the axis of rotation and may be of cylindrical form, the conveyor and the stators themselves have an inherent strength and rigidity which make it possible to utilize materials and forms of relatively light weight while providing a solid and, if desired, a continuous insulating wall about the axis which is advantageous with respect to the electrostatic conditions desired to be secured. In addition to properly supporting the conductive electrodes for inducing and conducting the charges one of these conditions relates to the field which exists between the exciter inductor member disposed at a given side of the conveyor wall and the screen inductor member disposed in spaced relation to the exciter inductor member at the same side of the conveyor wall as the exciter inductor member and at the opposite side from the collector electrode. These exciter and collector electrodes may be in the form of ionizers as disclosed in the French Patent No. 1,051,430 and in the corresponding U. S. application Serial No. 321,351 above referred to. Suitably to control this field, as disclosed in said patent and application, a material of low conductivity or high resistivity may be supported on the stator on which the exciter and screen inductor members are supported and extending along the surface of this stator between the inductor members.

The conveyor may take the form of a bell shaped rotor in which a cylindrical wall of insulating material concentric with the axis of rotation is supported at one end thereof by a flange or web portion which itself is supported on the rotatable element or shaft of the machine.

3

The unsupported end of the bell may be inserted in the space between the two stator walls which, as above indicated, either are both connected to and supported by the same supporting means or are connected together at the ends thereof that are adjacent each other and disposed along the axis of rotation from the stator wall supporting means, the outer stator at this end supporting the inner stator at this end thereof. In the first case the conveyor bell is open toward the stator supporting means and toward the rotatable element supporting means, and in the other case the rotor bell is open in the opposite direction along the axis of rotation.

The objects and features of the invention will be more clearly understood from the description to follow taken in connection with the drawings in which:

Fig. 1 is a longitudinal view, partially in section, of an electrostatic machine embodying features of the invention.

Fig. 2 is an exploded view of the stators and conveyor shown in Fig. 1.

Fig. 3 is a longitudinal section of an electrostatic machine of modified form and embodying features of the invention.

Fig. 4 shows a longitudinal view partially in section of an electrostatic machine operating in a gas under pressure and embodying features of the invention.

Fig. 5 shows diagrammatically two mutually exciting generators utilizing cylindrical conveyors of insulating material which may embody features of the invention.

In the embodiment of Fig. 1 the electrostatic machine utilizes a supporting member 1 which supports a rotatable driving element 3 rotatable on an axis and having a portion extending in cantilever relation to the supporting member 1 and projecting therefrom along the axis of rotation toward the right in Fig. 1. The rotatable element or shaft 3 may be supported for rotation thereof by bearings 5 supported in the member 1, the rotor 7 of a motor being carried on shaft 3 for rotation of the rotor 7 on the axis of rotation of the rotatable element 3 of the machine. The member 1 also may constitute the casing of the motor.

Extending toward the right from the member 1 in Fig. 1 the outer stator 9 is supported in cantilever relation to member 1 on the trued face 11 of the member 1 disposed in a plane transverse to the axis of rotation. The stator 9 preferably is in the form of a cylinder having an outer cylindrical surface 13 and an inner cylindrical surface 15 that are concentric with the axis of rotation of the rotatable element 3.

Similarly, the inner stator 17 extends from the face 11 of the member 1 toward the right in cantilever relation to the member 1 and provides an outer cylindrical surface 19 and an inner cylindrical surface 21. The inner cylindrical surface 15 and the outer cylindrical surface 19 are disposed in radially spaced relation to each other with respect to the axis. In this space between these two stators is disposed the wall 23 of the conveyor which provides an outer cylindrical surface 25 and an inner cylindrical surface 27 concentric with the axis. Wall 23 of the conveyor is carried by the web portion 29 which through the hub 31 is carried on the projecting end of the rotatable element or shaft 3. In the particular embodiment of Fig. 1 a sleeve 33 is provided on which the hub 31 of the conveyor 23 is secured and which is provided with a conical bore fitting upon the conical end 35 of the rotatable element or shaft 3.

The means for fastening the ends of the stator walls 9 and 17 of the member 1 at the face 11 are not shown in Fig. 1. The face 11 may be machined or otherwise made true and perpendicular to the axis and any suitable fastening means may be used for securely holding the faced ends of the stators upon the face 11 of the member 1 so that these stators may project from member 1 in cantilever relation thereto and so as to maintain the respective surfaces of revolution thereof concentric with the axis of rotation. The diameter of the shaft 3, having regard to the length thereof, and the diameter and axial extent of the hub 31 and of the sleeve 33 may be such as to provide the requisite rigidity to maintain the surfaces of revolution of the conveyor 23 concentric with the axis of rotation. The dimensions of the parts are preferably such that the surfaces of revolution, the cylindrical surfaces in the embodiment of Fig. 1, are disposed in close relation to each other so that the field-producing and charge-collecting elements carried by the stators may be disposed as close as possible to the surfaces of revolution of the conveyor wall while providing sufficient clearance for rotation of the conveyor.

In the embodiment of Fig. 1 at the left of the member 1 another electrostatic machine is disposed with the stators thereof and the conveyor of the same form and structural relation to each other as the stators and conveyor at the right hand of Fig. 1 but of opposite hand. The members of the electrostatic machine at the left in Fig. 1 are given the same reference numerals as at the right hand of this Fig. 1, the rotatable driving element having a second portion 3 extending toward the left in Fig. 1 in cantilever relation to the member 1 supporting this rotatable driving element, the member 1 supporting also the stators 9 and 17 and the conveyor 23 at the left that are in symmetrically opposite relation to these parts in the electrostatic machine at the right of Fig. 1. Both machines use the parts shown in Fig. 2.

The two electrostatic machines carried by the supporting member 1 and having a common motor driving these machines upon rotation of the rotor 7 thereof may be disposed within a casing 37 which may be pressurized with a gas at a pressure sufficient to provide the requisite dielectric strength to prevent breakdown between parts that are at maximum difference of potential while securing operation of the machine at the desired potential.

It will be understood from consideration of Fig. 2 taken in connection with Fig. 1, and having regard to the reference numerals applied to the parts in the exploded view of Fig. 2, that the three parts shown, namely, the outer stator 9, the inner stator 17 and the conveyor 23 are easily separable from each other. This may be accomplished by removal of the conveyor 23 from the rotatable element or shaft 3, upon releasing fastenings of conventional type not shown in the drawing, and then removing one or the other or both of the stators 9 and 17 by releasing the fastenings which secure these stators to the supporting member 1 at the face 11 thereof.

It also will be understood from consideration of Figs. 1 and 2 that the stators 9 and 17 and the conveyor 23, being of cylindrical form and preferably of plastic insulating material and all providing surfaces of revolution, easily may be machined or may be moulded to proper dimensions to provide close clearance between the conveyor and the adjacent stator walls while securing the proper spacing for electrostatic operation. It also will be clear that the stator 17, having an outwardly projecting flange at the left end thereof in Fig. 2, may be fitted closely to the stator 9 having an inwardly projecting flange at the left end thereof, so as to assist in securely holding these parts together while making them separable from each other.

In the embodiment of Fig. 3, a motor 41 is disposed for rotation of its rotor on a vertical axis and within a cylindrical casing 37, the axis of the rotor and its shaft 43 being co-axial with the casing 37. The shaft 43 of the motor projects beyond the end flange 45 of the motor in cantilever relation to the motor and flange. The shaft 43 supports a conveyor of insulating material for rotation thereof on the axis. This conveyor provides a cylindrical wall 47 extending about and co-axial with the axis of rotation, this wall in the present embodiment being supported by a web portion 49 carried by hub 51 which is provided with an inner metal sleeve 53 having a conical bore which fits upon the conical end of the shaft 43 and is secured to this shaft by the nut 55 threaded on the end of the shaft. In this embodiment the conveyor wall 47 projects along the axis from the web 49, that is, from the supported end of the wall 47 in the same direction as the projection of the shaft 43 in cantilever relation to the motor 41 and its flange 45. This conveyor 47 in Fig. 3 is in the form of a hollow cylindrical bell.

The outer stator 57 is supported on the flange 45 and extends therefrom in cantilever relation thereto in the same direction as the conveyor wall 47 with respect to the web 49. The stator 57 in this embodiment provides a wall of insulating material having a cylindrical surface adjacent the outer cylindrical surface of the conveyor wall 47. This outer stator 57 supports a charging or exciting inductor 59 shown at the left in Fig. 3 and a screen or output inductor 61 shown at the right in Fig. 3. These inductor members respectively are disposed in recesses in and adjacent the inner surface of the stator 57 and adjacent and in closely spaced relation to the outer cylindrical surface of the conveyor 47. The inductor members 59, 61 may be flush with the inner surface of the stator 57.

In the embodiment of Fig. 3 the inner stator 63 is supported on the outer stator 57 at the end of this outer stator that is disposed along the axis from the flange 45, the wall of insulating material of the stator 63 extending about the axis of rotation and projecting into the hollow space of the bell of the conveyor 47. This inner stator 63 supports the charging or exciting ionizer 65 at the left hand of Fig. 3 and also supports the collector ionizer 67 at the right hand of Fig. 3, these ionizers in the form of blades respectively being disposed in longitudinal recesses in the inner stator and edgewise to and adjacent the inner cylindrical surface of the conveyor wall 47 and in opposed relation respectively to the inductors 59 and 61.

The exciter inductor 59 may be connected by the conductor 69 to an exciter generator, not shown, for exciting the inductor 59 at a requisite potential. The exciter ionizer 65 may be connected through spring 66 and plate 70 and conductor 71 to a reference potential, or to ground or to the casing 37 of the machine, conductors 69 and 71 being maintained in insulated relation to each other.

The collector ionizer 67 and the screen inductor 61 are connected together through the spring contacts 73 and plate 74 and to the output terminal of the machine through the conductor 75 and through the protective resistances 77 and the high tension cable shown co-axial with the axis of rotation in Fig. 3, this cable having a conductor 79 therein carrying the requisite insulation thereon. The cable 79, the resistances 77 and the conductor 75 are supported by a central support 81 of insulating material which is held in position in cover 83 by nut 84 threaded on the end portion of support 81. The cover 83 is held in position by the clamping ring 85 upon the end of the casing 37. A gasket 86 is interposed between cover 83 and support 81 and a gasket 87 is interposed between the end of the casing 37 of the cover 83 to maintain the gas within the casing under pressure.

It will be understood from the description given in connection with Fig. 3 that the outer stator is supported by the stator supporting means which in this embodiment also is the means for supporting the rotatable element or shaft 43, this outer stator 57 extending from this common supporting means in cantilever relation thereto. The inner stator on the other hand is supported by the outer stator itself at the end thereof disposed along the axis from the outer stator and shaft supporting means. In this embodiment, however, because the conveyor is supported on the projecting end of the shaft and projects therefrom in the same direction as the shaft from its supporting means, and because there is space within the hollow bell shaped conveyor for the inner stator and the inner stator also is hollow, space is available for the disposition of other parts, such as the insulating support 81 and the parts carried thereby. Thus, the space within the casing is utilized to great advantage without waste, since no bearings or couplings are required to be disposed within the bell shaped conveyor and within the inner stator wall.

Fig. 4 shows a modification utilizing the inner and outer stators 9 and 17 of the form shown in Fig. 1, as well as the bell shaped conveyor 23 carried by means of its hub 31 on the shaft 3 rotatable in bearings 5 supported in a mounting 91. The shaft 3 extends at the left in Fig. 4 outwardly with respect to the mounting 91 for connection by means of a suitable coupling 93 to a driving motor or other power element.

In the embodiment of Fig. 4 the mounting 91 is provided with a flange 95 providing a face 11 perpendicular to the axis of rotation, upon which face, similarly to the embodiment of Fig. 1, the stators 9 and 17 are fastened and held in fixed relation thereto. This flange 95 also supports at its periphery the casing 97 which, by suitable means not shown, may be made pressure tight to the flange 95 in order to confine a gaseous dielectric medium within the casing 97 for advantageous electrostatic operation of the machine comprising stators 9, 11 and the conveyor 23. It is understood that these stators may support suitable inductor members and ionizers or other electrodes as described above in connection with Figs. 1 and 3. In order to maintain the pressure within the casing 97 a suitable packing or seal 99 may be provided within the mounting 91 and about the shaft 3 to prevent leakage of the gaseous fluid along this shaft.

Fig. 5 shows diagrammatically two conveyors 101, 103 of insulating material which may be driven by a common motor (not shown) as in Fig. 1. These conveyors may have a form corresponding to the conveyors of Fig. 1 that are disposed at the left hand and right hand of Fig. 1 and may be similarly supported so as to be rotatable on a common axis with motor as in Fig. 1.

Adjacent the outer surface of the conveyor 101 two exciter inductors 105 are disposed at opposite ends of a diameter and are electrically connected together. At the opposite side of the conveyor wall from the inductors 105 exciter ionizers 107 are disposed that are electrically connected together and, if desired, may be connected to ground. Disposed in circumferentially spaced relation about the axis from the inductors 105 and adjacent the outer surface of the conveyor 101, screen inductor members 109 are disposed that are electrically connected together and are connected to the respective collector ionizers 111 that are disposed at the opposite side of the conveyor from the screen inductors 109 in opposed relation thereto. It will be understood that fields developed between the exciter inductor members 105 and the respective ionizers 107 may produce ions to be carried on the inner surface of the conveyor 101 and collected at the respective collector ionizers 111. These charges may be delivered to the respective screen inductors 109.

These charges also are delivered through the connection 112 to the exciter inductors 113 of the machine at the right hand of Fig. 5, these exciter inductors being disposed at the ends of a diameter and adjacent the outer surface of conveyor 103. Ionizers 115 are disposed adjacent the inner surface of conveyor 103 in opposed relation to the inductors 113 and are electrically connected together and may be connected to ground. In circumferentially spaced relation to the inductor members 113 screen inductor members 117 are supported adjacent the outer surface of the conveyor 103. Charges developed on the inner surface of the conveyor 103 are collected by the collector ionizers 119 that are connected to the respective screen inductors 117 and are delivered to these screen inductors and are delivered also through the conductor 121 to the exciter inductors 105 of the machine at the left in Fig. 5.

Thus, it will be understood that the machine at the left in Fig. 5 serves to excite the right hand machine and that the machine at the right in Fig. 5 serves to excite the left hand machine. As shown in Fig. 5, the two collector ionizers 111 and the corresponding screen inductors 109 connected thereto in the left hand machine may be connected through the conductor 123 to output terminal 127 and the two collector ionizers 119 and the screen inductors 117 connected thereto may be connected through conductor 125 to output terminal 129 if it is desired to use the charges in an outside circuit.

The arrangement and inter-connection between the electrostatic machines shown in Fig. 5 is merely typical of how two such machines arranged as in Fig. 1 to be driven by a common motor, may be operated, for example, in accordance with the disclosure of the U. S. application of Roger Morel, Serial No. 465,395, filed October 28, 1954, now abandoned, in which two machines are mutually excited, or in accordance with the disclosure in the U. S. application of Noel Felici et al., Serial No. 492,496, filed March 7, 1955, in which one machine primed by auxiliary means is an exciter generator for a main generator. The two machines respectively at the right hand and left hand of Fig. 1 also may be operated independently of each other, if desired, by providing suitable excitation thereof. Either or both of the machines may be constructed in the manner disclosed in the U. S. application of Marcel Point, Serial No. 492,493, filed March 4, 1955, now Patent No. 2,754,433, dated July 10, 1956, in which both faces of the rotor are utilized to carry the ions, one face carrying positive charges and the other negative charges.

Other combinations and arrangements may be made which utilize the construction of an electrostatic machine which provides the two stators supported in cantilever relation to a supporting member and a conveyor of bell shape also supported in cantilever relation upon a driving element which projects from a supporting means in cantilever relation thereto.

In all these combinations and arrangements, the electrostatic machine utilizes an inductor member which comprises conductive inductor electrodes and the stationary member supporting said electrodes, which is flush with said electrodes, the space between said stationary member and the conveyor being as small and as constant as possible.

I claim:

1. An electrostatic machine comprising a conveyor having a wall of insulating material extending about an axis of rotation and about a hollow space within said wall, said wall providing an outer surface of revolution and an inner surface of revolution about said axis, an outer stator of said machine having a wall of insulating material extending about said axis and providing an inner surface of revolution about said axis, an inner stator of said machine having a wall of insulating material extending about said axis and providing an outer surface of revolution about said axis, said outer and inner stator walls being disposed respectively outwardly and inwardly with respect to and adjacent said outer and inner surfaces of revolution of said conveyor wall, a rotatable driving element, means supporting said driving element for rotation thereof on said axis of rotation and projecting in a given direction along said axis in cantilever relation to said driving element supporting means, said conveyor wall adjacent an end thereof being supported on the projecting portion of said driving element in cantilever relation to said driving element for rotation of said conveyor wall with said driving element on said axis of rotation between said stator walls, and means disposed adjacent said driving element supporting means and supporting said outer and inner stator walls with said inner and outer surfaces of revolution thereof respectively adjacent the outer and inner surfaces of revolution of said conveyor wall.

2. An electrostatic machine as defined in claim 1 in which said conveyor wall projects along said axis from said supported end thereof in said given direction in which said driving element projects from said driving element supporting means.

3. An electrostatic machine as defined in claim 1 in which said conveyor wall projects from said supported end thereof in the direction along said axis opposite to said given direction in which said driving element projects from said driving element supporting means.

4. An electrostatic generator comprising a conveyor having a wall of insulating material extending about an axis of rotation and about a hollow space within said wall, said wall providing an outer surface of revolution and an inner surface of revolution about said axis, an outer stator of said generator having a wall of insulating material extending about said axis and providing an inner surface of revolution about said axis, an inner stator of said generator having a wall of insulating material extending about said axis and providing an outer surface of revolution about said axis, means supporting said outer and inner stator walls respectively outwardly and inwardly with respect to and adjacent said outer and inner surfaces of revolution of said conveyor wall, said supporting means being disposed adjacent ends of said stator walls that are adjacent each other and supporting both said stator walls projecting from said supporting means along said axis of rotation in cantilever relation to said supporting means with said inner and outer surfaces of revolution thereof co-axial with said axis of rotation, and means supporting said conveyor wall adjacent the end thereof disposed along said axis from said stator wall supporting means for rotation of said conveyor wall on said axis in cantilever relation to said conveyor wall supporting means and with said conveyor wall disposed between said stator walls.

5. An electrostatic generator as defined in claim 4 in which said stators are separate members, and means separably connecting said stators to said stator wall supporting means to provide for separate removal of said stators from said stator wall supporting means.

6. An electrostatic generator as defined in claim 4 which comprises conductive electrodes respectively supported by said stators in opposed relation to each other adjacent and extending along the respective surfaces of revolution of said stators generally parallel to said axis of rotation for developing between said electrodes when charged an electric field intercepted by said conveyor wall of insulating material.

7. An electrostatic generator comprising a conveyor having a wall of insulating material extending about an axis of rotation and about a hollow space within said wall, said wall providing an outer surface of revolution and an inner surface of revolution about said axis, an outer stator of said generator having a wall of insulating material extending about said axis and providing an inner surface of revolution about said axis, an inner stator of said generator having a wall of insulating material extending about said axis and providing an outer surface of revolution about said axis, means supporting said outer and inner stator walls respectively outwardly and inwardly with respect to and adjacent said outer and inner surfaces of revolution of said conveyor wall, said supporting means being disposed adjacent ends of said stator walls that are adjacent each other and supporting both said stator walls projecting in a given direction along said axis in cantilever relation to said supporting means with said inner and outer surfaces of revolution thereof co-axial with said axis of rotation, a rotatable driving element, means disposed adacent said stator wall supporting means for supporting said driving element for rotation thereof on said axis of rotation of said conveyor wall and projecting in said given direction along said axis in cantilever relation to said driving element supporting means, means supporting said conveyor wall adjacent the end thereof disposed along said axis from said stator wall supporting means for rotation of said conveyor wall on said axis and projecting along said axis in the direction opposite to said given direction in cantilever relation to said conveyor wall supporting means and with said conveyor wall disposed between said stator walls, and means operatively connecting said rotatable driving element to said conveyor wall for effecting said rotation of said conveyor wall on said axis upon rotation of said rotatable driving element.

8. An electrostatic generator comprising a pair of conveyors each having a wall of insulating material extending about a common axis of rotation and about a hollow space within the respective conveyor walls, said walls each providing an outer surface of revolution and an inner surface of revolution about said axis, a pair of outer stators of said generator each having a wall of insulating material extending about said axis of rotation and providing an inner surface of revolution about said axis, a pair of inner stators of said generator each having a wall of insulating material extending about said axis and providing an outer surface of revolution about said axis, means supporting said outer and inner stator walls respectively outwardly and inwardly with respect to and adjacent the respective outer and the respective inner surfaces of revolution of said conveyor walls, said conveyor walls and the respective cooperating stator walls being disposed in spaced relation to each other along said axis of rotation, said stator wall supporting means supporting the walls of each pair of said stator walls projecting in opposite directions along said axis of rotation in opposed cantilever relation to said stator wall supporting means with said inner and outer surfaces of revolution of said stators co-axial with said axis of rotation, and means supporting said conveyor walls adjacent the respective ends thereof that are disposed along said axis in opposite directions from said stator wall supporting means for rotation of said conveyor walls on said axis in cantilever relation to the respective conveyor wall supporting means and with said conveyor walls disposed between the respective outer and inner stator walls.

9. An electrostatic generator comprising a conveyor having a wall of insulating material extending about an axis of rotation and about a hollow space within said wall, said wall providing an outer surface of revolution and an inner surface of revolution about said axis, an outer stator of said generator having a wall of insulating material extending about said axis and providing an inner surface of revolution about said axis, an inner stator of said generator having a wall of insulating material extending about said axis and providing an outer surface of revolution about said axis, said outer and inner stator walls being disposed respectively outwardly and inwardly with respect to and adjacent said outer and inner surfaces of revolution of said conveyor wall, a rotatable driving element, means supporting said driving element for rotation thereof on said axis of rotation and projecting in a given direction along said axis in cantilever relation to said driving element supporting means, said conveyor wall adjacent an end thereof being supported on the projecting portion of said driving element in cantilever relation to said driving element for rotation of said conveyor wall on said axis between said stator walls, said conveyor wall projecting from said supported end thereof in the same direction as said driving element from said driving element supporting means, means disposed adjacent said driving element supporting means and supporting said outer stator wall adjacent the end of said stator wall that is adjacent said driving element supporting means with said stator wall projecting in said given direction along said axis from said outer stator wall supporting means in cantilever relation thereto and with said inner surface of revolution of said outer stator wall co-axial with said axis of rotation, and means disposed adjacent the end of said outer stator wall spaced along said axis from said outer stator wall supporting means for supporting said inner stator wall on said outer stator wall and with said outer surface of revolution of said inner stator wall adjacent said inner surface of revolution of said conveyor wall.

10. An electrostatic generator comprising a conveyor having a wall of insulating material extending about an axis of rotation and about a hollow space within said wall, said wall providing an outer surface of revolution and an inner surface of revolution about said axis, an outer stator of said generator having a wall of insulating material extending about said axis and providing an inner surface of revolution about said axis, an inner stator of said generator having a wall of insulating material extending about said axis and providing an outer surface of revolution about said axis, said outer and inner stator walls being disposed respectively outwardly and inwardly with respect to and adjacent said outer and inner surfaces of revolution of said conveyor wall, a rotatable driving element, and means supporting said driving element for rotation thereof on said axis of rotation and projecting in a given direction along said axis in cantilever relation to said driving element supporting means, said conveyor wall adjacent an end thereof being supported on the projecting portion of said driving element in cantilever relation to said driving element for rotation of said conveyor wall with said driving element on said axis of rotation between said stator walls, said driving element supporting means supporting said outer and inner stator walls with said inner and outer surfaces of revolution thereof respectively adjacent the outer and inner surfaces of revolution of said conveyor wall.

11. An electrostatic generator as defined in claim 10 which comprises power means supported by said driving element supporting means and operatively connected to said rotatable driving element for effecting rotation thereof on said axis upon operation of said power means.

References Cited in the file of this patent

UNITED STATES PATENTS

| | | |
|---|---|---|
| 324,010 | Clarke | Aug. 11, 1885 |
| 883,846 | Wommelsdorf | Apr. 7, 1908 |
| 1,435,210 | Chubb | Nov. 14, 1922 |
| 2,009,503 | Landwerlin | July 30, 1935 |
| 2,530,193 | Felici | Nov. 14, 1950 |
| 2,610,994 | Bosch et al. | Sept. 16, 1952 |

FOREIGN PATENTS

| | | |
|---|---|---|
| 947,921 | France | Jan. 17, 1949 |